United States Patent Office 3,427,338
Patented Feb. 11, 1969

3,427,338
FUNCTIONAL OXYDISILETHYLENE MONOMERS
Cecil L. Frye, Midland, Mich., assignor to Dow Corning Corporation, Midland Mich., a corporation of Michigan
No Drawing. Filed Dec. 8, 1965, Ser. No. 512,529
U.S. Cl. 260—448.2                 12 Claims
Int. Cl. C07d *103/02;* C08g *31/00, 51/74*

ABSTRACT OF THE DISCLOSURE

Cyclic silethylenesiloxanes in which alkoxy and functional halogens are present on the silicon atom. They are useful as additives to obtain copolymers which can be vulcanized at room temperature and for increasing desirable crosslinking characteristics. Illustrative of a cyclic silethylenesiloxane is one of the formula

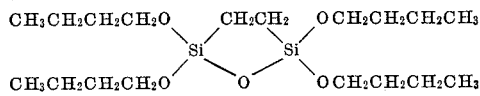

---

The present invention relates to novel cyclic silethylenesiloxanes and certain polymers thereof.

Cyclic organosiloxanes of the general formula

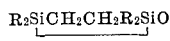

wherein R is defined as a monovalent hydrocarbon radical, are well known as disclosed in U.S. Patent 3,041,363, June 26, 1962. In the prior art, R is restricted solely to hydrocarbon radicals and fails to include alkoxy and other hydrolyzable or functional substituents.

It is an object of the present invention to introduce cyclic organosiloxanes in which alkoxy and functional halogens are present on the silicon atom. These novel cyclic organosiloxanes are useful in room temperature vulcanizing systems. For example, the functional monomers of this invention could be used as additives to obtain copolymers which can be vulcanized at room temperature. Relatively minor quantities can be used wherein the resulting copolymer is rendered functional and exhibits the attendant advantages obtainable therefrom.

The novel monomers of this invention would be desirable as additives for cross-linking purposes. They are unique in that they have two types of functional groups:
(1) The hydrolyzable alkoxy or halogen substituents and,
(2) the strained Si—O—Si bond of the ring. These two types of functional groups can be utilized independently by known methods and thus the compounds can be used to progressively cross-link silicone polymers.

These and other related objects will be apparent from the following detailed description of the invention.

The novel compounds of this invention are of a formula selected from the group consisting of

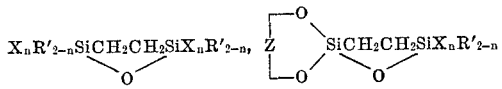

and

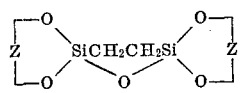

in which X is of the group consisting of alkoxy radicals or halogen atoms, R' is a monovalent hydrocarbon radical or halohydrocarbon radical, Z is a divalent hydrocarbon radical of from 2 to 8 inclusive carbon atoms and $n$ has a value of from 0 to 2, there being per molecule at least one halogen, alkoxy, or

radical.

In the formula above, where there is only one, two, or three X substituents that are alkoxy radicals, halogen atoms, or both, the remaining R' radicals can be any hydrocarbon or halohydrocarbon radical. Also, where Z radicals are present, the remaining radicals attached to the silicon atoms can be any hydrocarbon or halohydrocarbon radical, any alkoxy radical, or any halogen atom.

Therefore, in the above defined formulae, the functional X substituents can be methoxy, ethoxy, propoxy, isopropoxy, butoxy, isobutoxy, hexoxy, isooctaoxy, or octadecoxy, although for purposes of this invention, alkoxy radicals of from 1 to 4 carbon atoms are to be preferred. The functional X substituents can also be any halogen atom such as chlorine, bromine, iodine, or fluorine. Accordingly, the non-functional R' substituents, if any, can be any monovalent hydrocarbon and halohydrocarbon radical such as methyl, ethyl, propyl, isopropyl, butyl, t-butyl, dodecyl, octadecyl, myricyl, pentyl, isopentyl, hexyl, isohexyl, cyclohexyl, cyclopentyl, methylcyclohexyl, hexylcyclohexyl, cyclobutyl, cyclohexenyl, vinyl, allyl, methallyl, hexenyl, octadecenyl, β-phenylpropyl, β-phenylethyl, benzyl, chlorobenzyl, iodo-β-phenylpropyl, chloromethyl, chlorobutyl, bromopropyl, 3,3,3-trifluoropropyl, gamma-chloropropyl, (perfluoroethyl)ethyl, (perfluoropentyl)ethyl, (perfluorononyl)ethyl, iodophenyl, α,α,α-trifluorotolyl, perfluorocyclohexenyl, phenyl, tolyl, xylyl, ethylphenyl, mesityl, methylethylphenyl, n-propylphenyl, propylphenyl, isopropylphenyl, diethylphenyl, pentamethylphenyl, amylphenyl, butylmethylphenyl, propyldimethylphenyl, ethyltrimethylphenyl, diethylmethylphenyl, hexylphenyl, cyclohexylmethylphenyl, amylmethylphenyl, butylethylphenyl, butyldimethylphenyl, propylethylmethylphenyl, diphenyl, dipropylphenyl, naphthyl, 1-methylnaphthyl, 2-methylnaphthyl, 1-ethylnaphthyl, 2-ethylnaphthyl, phenylnaphthyl, anthracyl, 9-methylanthracyl, 2,3-dimethylanthracyl, 2,4-dimethylanthracyl, 9-ethylanthracyl, bromophenyl, o-bromotolyl, m-bromotolyl, p-bromotolyl, o-chlorotolyl, m-chlorotolyl, p-chlorotolyl, 2-chloro-m-fluorotolyl, 2,6-dichlorotolyl, 4-bromo-o-xylyl, dichloroxylyl, 5-bromo-m-xylyl, 2-bromo-p-xylyl, 2-bromomesityl, 3-bromo-o-tolyl, 2-bromo-1-ethylphenyl, 4-bromo-1,3-diethylphenyl, 6-bromo-3-ethyltolyl, 2-bromo-4-ethyltolyl, 4-bromo-1-propylphenyl, 4-bromo-1-isopropylphenyl, 4-bromo-1-methyl-3-isopropylphenyl, 4 - bromo-1 - tertiary-butylphenyl, 4 - bromo - 1 - tertiary - amylphenyl, chlorophenyl, alpha-bromophenyl, betabromophenyl, 2-chloronaphthyl, 1-bromo-3-chloronaphthyl, 2-chloro-1-methylnaphthyl, 1-bromo-8-methylnaphthyl, 1-bromo-2,3-dimethylnaphthyl, 1 - bromo-4 - methylnaphthyl, 1,10-dibromo-anthracyl, 9,10-dichloroanthracyl, phenanthryl, 3-methylphenanthryl, and 1,4-dimethylphenanthryl, among others.

In the above formulae, Z can be any divalent hydrocarbon of from 2 to 8 carbon atoms. It is to be noted therefore that Z can be

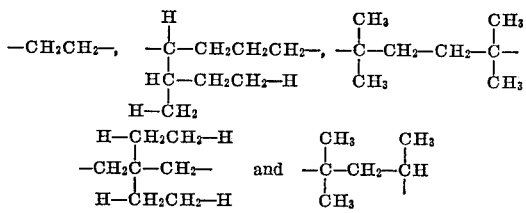

among others.

Some of the cyclic silethylenesiloxanes of this invention can be prepared by reacting, (1) a vinyl silane of the general formula $$CH_2=CHSiX_mR'_{3-m}$$

wherein X is an alkoxy radical or a halogen atom, $m$ has a value from 1 to 3 inclusive, and each R' is any monovalent hydrocarbon or halohydrocarbon radical, with (2) a hydrogen siloxane of the general formula $$(R'HSiO)_x$$

wherein $x$ is an integer of at least 3, and R' is any monovalent hydrocarbon or halohydrocarbon radical, in the presence of catalytic platinum.

In the above reaction, an intermediate compound of the formula

is formed. This intermediate product is then appropriately heated in the presence of a base and a rearrangement occurs, whereby the resulting cyclic has the formula

where X, R', and $n$ are as defined above.

Other cyclic silethylenesiloxanes of this invention can be prepared by reacting, (1) a vinyl silane of the general formula $$CH_2=CHSiX_mR'_{3-m}$$

wherein X, $m$, and R' are as defined above, with
(2) a hydrogen disiloxane of the formula

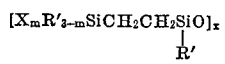

wherein R' is as defined above, in the presence of catalytic platinum.

In the above reaction, an intermediate compound of the formula $[X_mR'_{3-m}SiCH_2CH_2SiR'_2]_2O$ is formed. This intermediate product is then appropriately heated in the presence of a base. The resulting cyclic has the formula

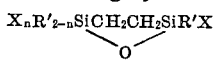

For purposes of this invention, it is to be noted that upon formulation of the desired cyclic, a linear by-product of the formula

is evolved. Subsequent partial hydrolysis in the presence of heat and a catalytic base will convert said by-product to the desired cyclic, resulting in additional yields of the cyclic organosiloxanes of this invention.

By the term partial hydrolysis in the above is meant a hydrolysis whereby only 1 mole of water is employed so that it will react with two X radicals of the above by-product.

Cyclic silethylenesiloxanes of this invention can also be prepared by reacting, (1) the intermediate compound defined above of the formula $[X_mR'_{3-m}SiCH_2CH_2SiR'_2]_2O$ with
(2) 2 moles of a diol of the general formula $Z(OH)_2$, wherein Z is as defined above, in the presence of a base and 1 mole of water.

In the above reaction, thermal cracking in the presence of a base results so that the composition yielded is a strained ring depolymerization product of the formula

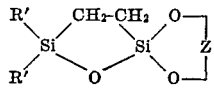

wherein Z and R' are as defined above.

In the process for obtaining the intermediate compound used in this invention, the catalytic platinum is ordinarily used in concentrations of from $1\times10^{-3}$ to $1\times10^{-7}$ mole per mole of vinylsilane. The commercial form of the catalyst is the hexahydrate, $H_2PtCl_6\cdot 6H_2O$, and this form is completely satisfactory. Since relatively minute amounts are used, it is best to employ a solution of the catalyst, e.g. in isopropanol or the dimethylether of diethylene glycol.

It is also to be noted that any desired X and R' radicals in the compositions of this invention are readily and easily obtained by selecting the appropriate vinylsilane reactant. Illustrative of such reactants are the compounds

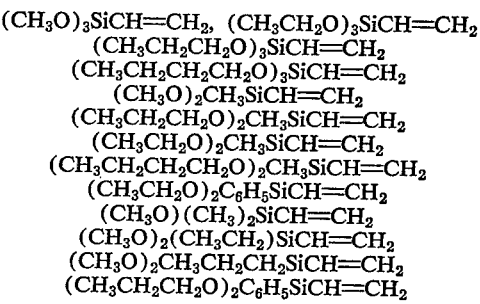

Also illustrative of said reactants are the compounds,

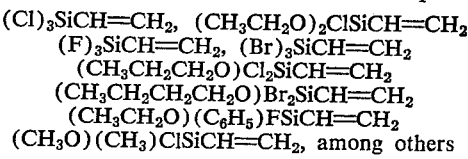

When the necessary siloxane intermediate is formed, if appropriate, it is partially hydrolyzed and then "cracked." After partial hydrolysis and prior to alkaline "cracking" the partial hydrolyzate is neutralized or washed free of substantially all of any acid catalyst or by-product residual acid which may be present prior to the said "cracking" operation.

It is preferred that the partial hydrolyzate then be stripped of any low-boiling solvent which may be present and the "cracking" catalysts then added. It is to be noted that no catalyst is required in the "cracking" operation, however inclusion of a catalyst will preferably increase the yield of strained ring cyclics. Illustrative of the cracking catalysts that can be used on the non-acidic siloxane substrates are $CH_3CH_2CH_2CH_2Li$, sodium methoxide, $Na_4SiO_4$, $Na_2SiF_6$, CaO, $CaCO_3$, $Ca(OH)_2$, BaO, and $Na_2CO_3$ among others. Although any of the above catalysts can effectively function in this invention, the preferred catalysts are the alkaline earth metal oxides rather than the alkali metals, and particularly BaO, due to the increased yield of products and strained rings obtained. The selection of a catalyst can also have a significant effect on the concentration of strained ring cyclics produced. Depending upon the choice of catalyst, e.g., whether it is a weak or strong base, varying yields of strained rings are obtained. For example, when $$CH_3CH_2CH_2CH_2Li$$

or equivalent moderately strong or very strong bases are used, the yield of strained rings will be significantly lower than when a weak base such as BaO is used, due to Si—C redistribution in addation to the desired Si—O—Si redistribution.

The temperature required for the cracking operation is in the range of from 200° to 420° C. Atmospheric pressure can be used when the product is one of the low-boiling cyclics, e.g., when all or most of the X and Z radicals are of low molecular weight. When the product is of relatively high molecular weight it is preferred to operate under reduced pressures.

The cyclics defined above are both derivatives of the reactive 1,2,5-oxadisilacyclopentane heterocyclic system disclosed in U.S. Patent 3,041,363, June 26, 1962, however those disclosures were limited to derivatives in which the two silicon atoms were fully substituted with alkyl and aryl substituents. The compounds of this invention are unique and distinctive in that they contain silicon atoms substituted with functional radicals.

This invention also relates to novel cyclic silethylenesiloxanes prepared by reacting.

(1) a vinyl silane of the general formula $CH_2\!=\!CHSiX_3$ wherein X is as defined above, with
(2) a hydrogen siloxane of the general formula $X_3SiH$, wherein X is as defined above, in the presence of catalytic platinum.

In the above reaction, an intermediate compound of the general formula $X_3SiCH_2CH_2SiX_3$ is formed. This intermediate compound is then reacted with 2 moles of a diol of the general formula $Z(OH)_2$, wherein Z is as defined above, in the presence of a base and 1 mole water. Partial hydrolysis and thermal "cracking" is as previously defined. Rearrangement occurs whereby a compound of the formula

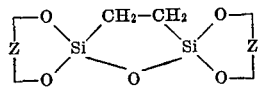

results.

It is to be noted that the above intermediate compound can also be similarly reacted with appropriate monofunctional alcohols to obtain cyclics of the formula

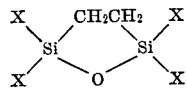

The following examples are intended to aid those skilled in the art in understanding and practicing this invention. The examples do not delineate the scope of the invention.

Example 1

43.0 g. of

was reacted with 29.2 g. of

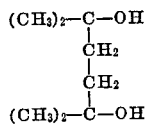

in presence of 1.8 g. of water in a 250 ml. distillation flask and a catalytic amount of $NaOCH_3$ was added. The flask was attached to a distillation column and heated to a temperature of 260° to 300° C., removing $CH_3OH$ as it formed. After 10 to 12 hours, 17.3 g. of $CH_3OH$ was removed. Subsequent alkaline cracking at a temperature of 300° to 340° C. yielded a compound of the formula

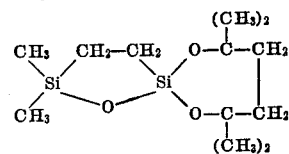

being collected at 80° C., and 0.3 mm. Hg pressure.

Example 2

18.6 g. of hexamethoxydisilethylene, 29.2 g. of 2,5-dimethylhexane-2,5 diol, and a trace of $NaOCH_3$ was added to a 250 ml. distillation flask. The flask was attached to a distillation column and heated to cause alcoholysis. The mixture was further heated to 260° C. for 1 hour and 11.5 g. of $CH_3OH$ was collected. 1.8 g. of water was then added. Subsequent alkaline cracking at a temperature of 300° to 360° C. yielded a compound of the formula

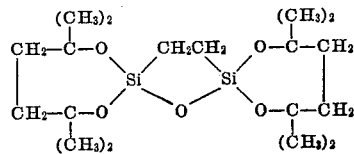

being collected at 100° C., and 0.05 mm. Hg pressure. The compound had a melting point of 78–80° C.

Example 3

54.0 g. of $[(CH_3O)_3SiCH_2]_2$, 59.0 g. of dry $$CH_3CH_2CH_2CH_2OH$$

and a catalytic amount of $NaOCH_3$ was added to a 250 ml. distillation flask. The flask was attached to a distillation column and heated to evolve $CH_3OH$. After 2 hours, 24.7 g. of $CH_3OH$ was collected. 3.6 g. of water was added and further heating removed an additional 11.5 g. of $CH_3OH$. Subsequent alkaline cracking at 250° to 285° C. yielded 53.2 g. of volatile materials. Upon refractionation 33 g. of material of the formula

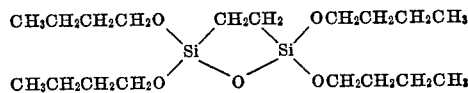

was collected at 119° C., and 0.01 mm. Hg pressure.

Example 4

To a 250 ml. distallation flask was added 98.5 g. of $[(CH_3O)_3SiCH_2CH_2Si(CH_3)_2]O$ and 0.05 g. of $NaOCH_3$. The flask was then attached to a distillation column and heated to a cracking temperature of 250° to 285° C. The volatile materials were collected and upon redistillation a compound of the formula

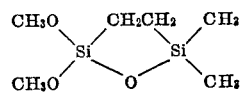

was collected at 50° to 60° C. at 0.6 mm. Hg pressure.

Example 5

236.0 g. of $CH_2\!=\!CHSi(CH_3)_2OCH_3$, and 6 drops of $H_2PtCl_6$ was added to a 500 ml. flask. The flask was heated to 81° C. and 120.8 g. of

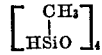

was slowly added. The reaction was exothermic and the temperature rose to 150° C. The solution was stirred until cool and infrared analysis indicated a compound of the formula

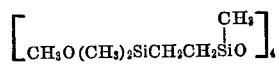

100 ml. of

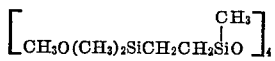

and 1.9 g. of BaO was added to a 200 ml. flask. The flask was heated in a range of from 390° to 420° C. A yield of 81.0 g. of a compound of the formula

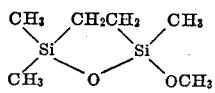

was obtained.

Example 6

490 g. of $CH_2{=}CHSi(CH_3)_2Cl$ and 6 drops of $H_2PtCl_6$ was added to a 1 liter flask. The mixture was stirred and heated to reflux and 238.2 g. of

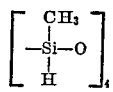

was slowly added. This was then heated to 240° C. and cooled to room temperature and a compound of the formula

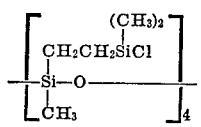

was obtained. 100 ml. of

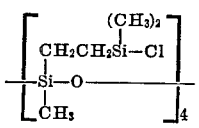

and 0.5 cc. of butyl borate was added to a 1 liter flask. This was heated at 365° to 390° C. for 8½ hours and 93.4 g. of a compound of the formula

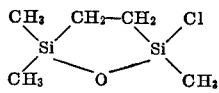

was collected. Analysis showed 75 percent of the product to be strained ring.

In the above, when no catalyst was used and the mixture was heated at 360° to 440° C., 97.5 g. of the novel cyclic was obtained with 50 percent of the products strained rings.

Example 7

When 1 mole of the cyclic compound of the formula

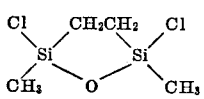

is reacted with 1 mole of a hydroxyl end-blocked polydimethylsiloxane of the formula $HO[(CH_3)_2SiO]_{25}H$, in the presence of triethylamine a compound of the formula

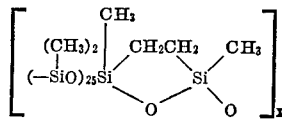

results.

Example 8

When $CH_2{=}CHSiCH_3(Cl)_2$ and $CH_2{=}CHSi(Cl)_3$ are substituted for the silane in Example 6, compounds of the formulae

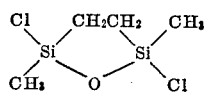

and

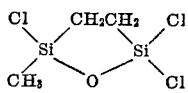

are obtained.

Example 9

When Br, I and F are substituted for the corresponding halogen in Examples 6 and 7 equivalent results are obtained.

Example 10

Addition of vinyl trimethoxy silane to

in the presence of a platinum catalyst will give a structure of the formula

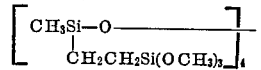

100 ml. of this intermediate was cracked in the presence of numerous cracking catalysts at temperatures in a range of from 300° to 420° C., to obtain the desired novel cyclic of the formula

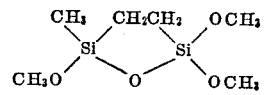

Varying conditions and results are tabulated in the following table.

| Number | Catalyst | Yield of Products, g. | Percent Products Strained ring | Cracking time, hours | Temp. range, °C. |
|---|---|---|---|---|---|
| 1 | 0.1028 g. Na$_2$SiO$_3$ | 47.2 | 2–4 | | 370–380 |
| 2 | 0.1055 g. Na$_4$SiO$_4$ | 42.1 | 11 | | 300–310 |
| 3 | None | 52.8 | 19 | | 385–415 |
| 4 | 0.1022 g. Na$_2$SiF$_6$ | 45.8 | 12.5 | 3 | 360–370 |
| 5 | 0.1012 g. CaO | 65.0 | 35 | 5.5 | 380–415 |
| 6 | 0.1002 g. CaCl$_2$ | 62.8 | 45 | 7 | 380–410 |
| 7 | 0.1068 g. AlCl$_3$ | 33.2 | 1 | 1.5 | |
| 8 | 0.1060 Al (IOPr)$_3$ | 41.1 | 1 | 1.5 | 315–320 |
| 9 | 0.1060 Ca(OH)$_2$ | 60.4 | 41 | 7 | 380–415 |
| 10 | 0.1046 CaO | 65.3 | 42 | 5.5 | 380–420 |
| 11 | 0.1060 BaO | 79.9 | 45 | 6 | 380–420 |
| 12 | 0.1060 Na$_2$CO$_3$ | 72.1 | 22 | 1.5 | |

That which is claimed is:

1. A cyclic organosilicon compound of a formula selected from the group consisting of

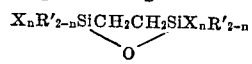

and

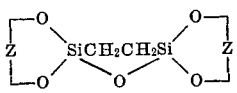

in which

X is a monovalent radical selected from the group consisting of halogen atoms and alkoxy radicals, R' is a monovalent radical selected from the group consisting of hydrocarbon radicals and halohydrocarbon radicals of from 1 to 12 inclusive carbon atoms, Z is a divalent hydrocarbon radical of from 2 to 8 inclusive carbon atoms, and $n$ is an integer of from 0 to 2 inclusive, there being per molecule at least one silicon bonded halogen, alkoxy, or

radical.

2. The cyclic organosilicon compound as recited in claim 1 wherein the formula is

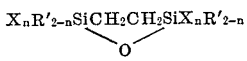

3. The cyclic organosilicon compound as recited in claim 2 wherein the formula is

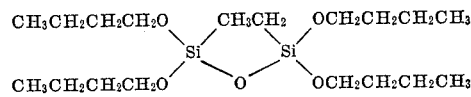

4. The cyclic organosilicon compound as recited in claim 2 wherein the formula is

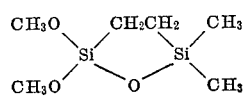

5. The cyclic organosilicon compound as recited in claim 2 wherein the formula is

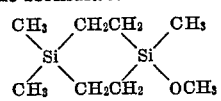

6. The cyclic organosilicon compound as recited in claim 2 wherein the formula is

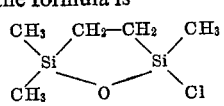

7. The cyclic organosilicon compound as recited in claim 1 wherein the formula is

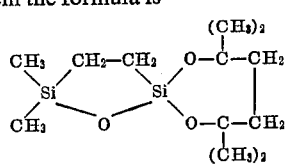

8. The cyclic organosilicon compound as recited in claim 1 wherein the formula is

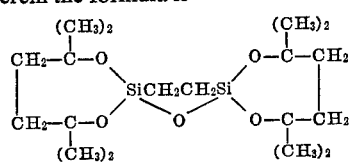

9. A method for making cyclic organosiloxanes of the formula

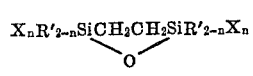

and

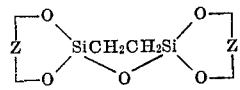

(A) comprising heating a compound of the formula (1) $[X_mR'_{3-m}SiCH_2CH_2SiO]_x$ with R' substituent (2) 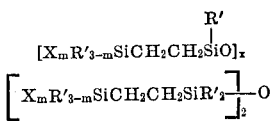

or (3) 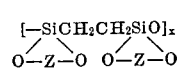

in which

X is of the group consisting of alkoxy radicals or a halogen atom, and each

R' is a monovalent hydrocarbon or halohydrocarbon radical of from 1 to 12 inclusive carbon atoms, Z is any divalent hydrocarbon of from 2 to 8 inclusive carbon atoms, $m$ is an integer from 1 to 3 inclusive, $n$ is an integer from 0 to 2 inclusive, and $x$ is an integer of at least 3, (B) in the presence of a base selected from the group consisting of organolithiums of the formula R"Li, in which R" is an alkyl or aryl radical of from 1 to 12 inclusive carbon atoms, sodium alkoxides of the formula NaOR", in which R" is an alkyl or aryl radical of from 1 to 12 inclusive carbon atoms, $Na_4SiO_4$, $Na_2SiF_6$, CaO, $CaCO_3$, $Ca(OH)_2$, BaO, and $Na_2CO_3$, and thereafter recovering said cyclic organosiloxane compound.

10. The method as recited in claim 9 wherein Compound 2 in which $m$ is 3 is heated in the presence of 2 moles of a diol of the formula $Z(OH)_2$, wherein Z is any divalent hydrocarbon of from 2 to 8 carbon atoms whereby a compound of the formula

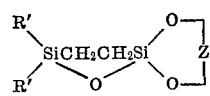

is formed.

11. The method as recited in claim 9 wherein Compound 3 in which $m$ is 3 is heated in the presence of 2 moles of a diol of the formula $Z(OH)_2$ wherein, Z is any divalent hydrocarbon radical of from 2 to 8 carbon atoms whereby a compound of the formula

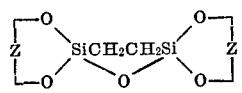

is formed.

12. The method as recited in claim 9 wherein the base is BaO.

References Cited

UNITED STATES PATENTS

| | | | |
|---|---|---|---|
| 2,777,869 | 1/1957 | Bailey et al. | 260—448.2 |
| 3,041,362 | 6/1962 | Merker | 260—448.2 |
| 3,053,872 | 9/1962 | Omietanski | 260—448.2 |
| 3,294,740 | 12/1966 | McVannel | 260—46.5 XR |
| 3,355,475 | 11/1967 | Baney | 260—448.2 |

TOBIAS E. LEVOW, *Primary Examiner.*

J. P. PODGORSKI, *Assistant Examiner.*

U.S. Cl. X.R.

260—46.5, 448.8